United States Patent
Schlegel et al.

(10) Patent No.: US 6,560,869 B1
(45) Date of Patent: May 13, 2003

(54) METHOD FOR PRODUCING A CONNECTING ROD EYE

(75) Inventors: Udo Schlegel, Vechelde (DE); Reinhard Vogelsang, Salzgitter (DE)

(73) Assignee: Volkswagen AG (DE)

( * ) Notice: Subject to any disclaimer, the term of this patent is extended or adjusted under 35 U.S.C. 154(b) by 33 days.

(21) Appl. No.: 09/033,874

(22) Filed: Mar. 3, 1998

(30) Foreign Application Priority Data

Mar. 4, 1997 (DE) .......................................... 197 08 567

(51) Int. Cl.$^7$ ................................................. B23P 15/00
(52) U.S. Cl. ........................ 29/888.09; 29/413; 29/416
(58) Field of Search ......................... 29/888.09, 888.01, 29/413, 414, 416, 463, 426.5, 458; 74/595, 579 R, 594, 579 E; 427/327, 328, 444, 446, 448, 453, 454, 455, 456

(56) References Cited

U.S. PATENT DOCUMENTS

| 2,371,399 A | 3/1945 | Mantte |
| 5,080,056 A | 1/1992 | Kramer et al. |

FOREIGN PATENT DOCUMENTS

| DE | 331379 | 5/1918 |
| DE | 3242543 | 11/1982 |
| DE | 3705904 | 2/1987 |
| DE | 3916498 | 5/1989 |
| DE | 4007437 | 3/1990 |
| DE | 4142454 | 12/1991 |
| DE | 4322832 | 7/1993 |
| DE | 4342436 | 12/1993 |
| DE | 19549403 | 10/1995 |
| DE | 19547388 | 12/1995 |
| FR | 2702496 | 3/1993 |
| GB | 1083792 | 8/1964 |
| GB | 1083003 | 10/1965 |
| WO | 9418463 | 8/1994 |
| WO | 9624458 | 8/1996 |

OTHER PUBLICATIONS

Harold Kayser, *Eignung thermisch gespritzter Metall– und Keramikschichten für Gleitlager*, Maschinenmarkt, Würzburg, 80 (1974) 1.
*Mehrfachhonen von Lagerbohrungen in Pleuelstangen*, Industrie–Anzeiger, Nr. 84, 107 Jg., S.22 (1985).
Hans Reininger, *Flammgespritzte Gleitlager. In:* Maschinenmarket, Würzburg, 73 Jg., (1966) Nr. 39, S.30–32; S.31, linke Sp., letzter Abs. u. rechte Sp., Abs. 1+2.
Kunibert Hanusch, u.a.: *Plasmagespritzte Überzüge.* In: Blech, Nr. 8, 1968, 15. Jg., S.453–S.461.
*JP 5–339700 a., Patents Abstracts of Japan*, C–1185, vol. 18, No. 185 (Mar. 30, 1994).

*Primary Examiner*—Irene Cuda
(74) *Attorney, Agent, or Firm*—Baker Botts LLP

(57) ABSTRACT

In the particular embodiments described in the specification, bearing material is applied to the bearing surface of a connecting rod eye by thermal spraying of the bearing material such as by plasma coating. In a particular embodiment the large connecting rod eye is plasma-coated with an aluminum bronze. After the plasma coating, the connecting rod eye is opened by removing the bearing cover from the rest of the connecting rod, thereby breaking the plasma layer. Subsequently, the cover is screwed on again, and the surface of the bearing layer is finished by fine spindling. The method results in reduced assembly costs.

29 Claims, 2 Drawing Sheets

METHOD FOR PRODUCING A CONNECTING ROD EYE

BACKGROUND OF THE INVENTION

This invention relates to methods of producing bearing surfaces in the opening or "eye" of a connecting rod such as used in automobile engines.

Conventional connecting rods, in particular those for internal combustion engines, are designed as so called "cut" connecting rods or "cracked" connecting rods. In this case, it is the large connecting rod eye which surrounds the crankshaft that is cut or cracked. The small connecting-rod eye generally does not need to be opened since it is connected to the piston by a straight pin which can be passed through the eye.

Connecting rod eyes are customarily fitted with one of several different bearing shells i.e., sliding bearings, depending on the load to be applied to the bearing. Backing shell materials used in particular as bearing shells are generally made of C 10 steel according to DIN Standard 17210 or SAE Standard 1010. Depending on its constructional shape and use, a bearing shell may be cold-hardened. The actual sliding layer of the sliding bearing which is applied to the backing shell material may be, for example white metal, leaded bronze, light metal, a sputter layer or the like, which is selected according to the anticipated load on the bearing. The bearing shell may be designed as a ternary, binary or solid bearing shell or in other ways. In order for the bearing shell to achieve a perfect fit after assembly, it is mounted with prestress.

The bearing shell not only constitutes a material cost factor, it also entails production expenditure and constitutes a source of error. Thus, for example, the insertion of a bearing shell or a half bearing shell may be overlooked during assembly, resulting in considerable damage to the engine.

SUMMARY OF THE INVENTION

Accordingly, it is an object of the present invention to provide a method for producing a connecting rod eye which overcomes disadvantages of the prior art.

Another object of the invention is to provide a method for producing a connecting rod bearing with reduced assembly costs.

According to the invention, a bearing shell is no longer required in a connecting rod eye, and particularly a large connecting rod eye, and possibly even both connecting rod eyes. Instead, a bearing layer is applied directly to the surface of a connecting rod eye by thermal spraying. Plasma spraying is used preferably as thermal spraying and the connecting rods are preferably parts of an internal combustion engine.

As the bearing layer a metal, and preferably a metal alloy, is sprayed on. Moreover, a mixture of different metals, preferably metal alloys, is used. In one embodiment the mixture may be, for example, a mixture of aluminum and tin, in which case the mixture is obtained particularly advantageously by mixing the individual components in powder form. The classification of the metal powder depends, inter alia, on the individual spraying parameters and can easily be determined by the person skilled in the art in a series of tests. As bearing materials, bronzes are advantageously used, in particular aluminum bronze or aluminum/tin or even copper bronze, as well as metal/soft material layers and/or metal/solid lubricant layers. Soft metals, such as lead, are used, for example, as soft materials, which are dispersed in a harder metal such as, for example, alloyed aluminum such as aluminum/copper/magnesium/chromium. However, other materials such as, for example, fluoropolymers, e.g. polytetrafluoroethylene, can also be used as soft materials. Examples of suitable solid lubricants are compounds such as molybdenum disulfide, boron nitrite and graphite.

The bearing material is sprayed on particularly advantageously to produce an oversize layer which is subsequently reworked mechanically. Honing is used, for example, for reworking. In particular, fine spindling is suitable. In the case of honing, preferably about 20 μm to 300 μm, and in particular about 50 μm to 200 μm, of the bearing material is removed. In the case of fine spindling, the oversize is advantageously 50 μm to 1000 μm, and in particular 100 μm to 500 μm.

The finished bearing layer, after removal of the oversize, is preferably about 150 μm to 800 μm thick, and in particular about 200 μm to 500 μm thick. Such a layer is far thinner than conventional bearing shells, which have a thickness of about 2.5 mm. This means that either more material around the edge of the connecting rod remains, thereby permitting a higher loading, or that connecting rods of lower weight can be produced.

According to the invention, the connecting rod eye which is coated with the bearing material by thermal spraying is advantageously separated into two parts only after the bearing material has been applied. This procedure is used particularly when the connecting rod eye is to be broken open. In this process, the inner surface of the connecting rod eye is scored with a notch at each of the desired breaking points. The notches are preferably made by a laser, in which case a beam from a solid state laser, for example, is introduced at about 45° into the connecting rod eye. The laser power used is in particular, about 5 to 10 kW. The notch preferably has a width of about 0.3 mm to about 0.8 mm and a depth of about 0.2 mm to about 0.7 mm. The breaking point is usually located approximately centrally in the connecting rod eye. Alternatively, the notch can also be made by a broaching tool, for example by impact.

The procedure followed when notching and breaking the connecting rod eye is preferably such that the connecting rod eye is first notched, then the bearing material is applied by thermal spraying, and subsequently the breaking is carried out. By this procedure, the gap which is otherwise present at the breaking point or between the individual bearing shells is reduced or eliminated. Under a high engine load, such a gap causes the oil film to tear away. By notching prior to coating of the bearing material, improved lubricating properties are achieved. Under some circumstances, breaking can also take place prior to the coating of the bearing material, which is then broken again, preferably without notching.

If the connecting rod eye is opened by being cut open, this preferably takes place before the bearing material is applied by thermal spraying. In this procedure, the connecting rod eye is cut open, and the separation surfaces of the remaining connecting rod and the connecting rod bearing cover are smoothed individually by broaching. The parts are subsequently fitted together again, provided with bores and threads and screwed together. In this case as well a notch is advantageously made at the separation point in the connecting rod eye which has been screwed together again, preferably prior to coating with the bearing material. Subsequently, the connecting rod eye is broken open again to separate the bearing layer. If the breaking takes place too unevenly in this case, the bearing layer itself has to be notched.

The honing or spindling treatment of the bearing layer to remove excess material as described above takes place particularly advantageously only after the connecting rod eye has been opened. As a result, any burr which may occur at the breaking edge when the bearing layer is broken is removed at the same time as the excess material is removed.

An oil duct can also be provided in the eye of a connecting rod produced according to the invention. The oil duct is advantageously bored into the connecting rod eye only after the bearing layer has been applied and, in particular, after the bearing layer has been reworked. In this case as well, the oil duct can be bored through the connecting rod itself so as to extend to the opposite connecting rod eye.

According to the invention, the large flat side surfaces of the connecting rod are advantageously reworked only after the bearing layer has been applied. This reworking preferably takes place by grinding the flat surfaces.

In the method according to the invention, the bearing surface of the connecting rod eye is preferably roughened prior to applying the coating. The roughening is preferably accomplished by sandblasting. However, blasting using a liquid at high pressure is also possible. In this case, the material of the eye, in particular a C 70 steel, is advantageously roughened to an average peak-to-valley height $R_a$ of about 4 μm to about 30 μm, in particular about 8 μm to about 12 μm. With such average peak-to-valley heights, particularly good adherence of the bearing material on the material of the connecting rod eye is achieved.

For particularly advantageous production of the bearing layer in the connecting rod eye, at least one of the flat side surfaces of the connecting rod eye is covered with a template which has an opening in the region of the connecting rod eye. The template opening should be approximately the same size as the connecting rod eye, so that, on the one hand, the template does not interfere with the coating operation and, on the other hand, coating of the flat side surface in the region of the connecting rod eye is largely avoided. If only one flat surface is covered with the template, the other flat surface advantageously lies on a pallet which, like the template, has an opening in the region of the connecting rod eye.

According to the invention, the connecting rod eyes of several connecting rods are advantageously coated in one operation. For this purpose, a plurality of connecting rods, advantageously 2 to 10, and in particular 4 to 8, are positioned one above another in such a way that the connecting rod eyes to be coated form a cylinder. For this purpose, a holder may be provided on a special pallet so that the holder centers the connecting rods placed in the holder. The connecting rods, which are coated virtually simultaneously in this method, are advantageously kept together as a group in order subsequently to be installed together in the same internal combustion engine. All of the connecting rods of an internal combustion engine are thus advantageously coated at the same time by placing them one above another. If this is not possible on account of the design because of the number of cylinders, for example 12 cylinders, at least the connecting rods of one row of cylinders i.e., 6 for a V 12 engine, are coated lying one above another. The result of this procedure is that connecting rods of the same quality are installed in one internal combustion engine.

During thermal spraying, a gas stream is particularly advantageously passed through the connecting rod eye, in particular when a plurality of connecting rods are coated lying one above another. Air which is conditioned and purified is particularly suitable as gas stream. Preferably, the air stream should be virtually free of grease and moisture and, whenever possible, it should have a temperature within a given range, i.e. about 20° C. The air stream advantageously has a flow velocity of about 3 m/s to 15 m/s, and in particular about 5 m/s to 8 m/s. Any overspray occurring during spraying will be blown away by the gas stream.

The bearing material is preferably sprayed using a rotating spray diffuser which is introduced into the connecting rod eye or the stacked connecting rod eyes, and which starts rotating above the connecting rod eye. Using such a spray diffuser, an especially even coating is achieved in the connecting rod eye. During coating of a connecting rod eye according to the invention, the spray diffuser is inserted into and is passed through the eye with an advancing rate of preferably about 0.5 mm/s to 20 mm/s, in particular about 2 mm/s to 8 mm/s.

During the spray application, a plurality of layers of the bearing material are preferably applied to the surface of the connecting rod eye. In particular 4 to 30 layers are preferably formed in the connecting rod eye. In the process, the layers are advantageously applied in different directions which, in turn, serves to improve the layer quality. This is achieved in the connecting rod eye by the fact that the spray diffuser coats the connecting rod eye while it is being inserted and while it is being retracted, and a rotating spray diffuser preferably maintains the same direction of rotation.

According to one aspect of the invention, the connecting rods are coated with the bearing material in series production. In this case, it is advantageous if at least some individual connecting rods from the series are measured. In this case, the average peak-to-valley height $R_a$, and/or the characteristics of the bearing material itself, for example the evenness of the distribution of the bearing material when a mixture is used, are measured. Such measurements of the connecting rods are preferably carried out in a nondestructive manner.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 2:
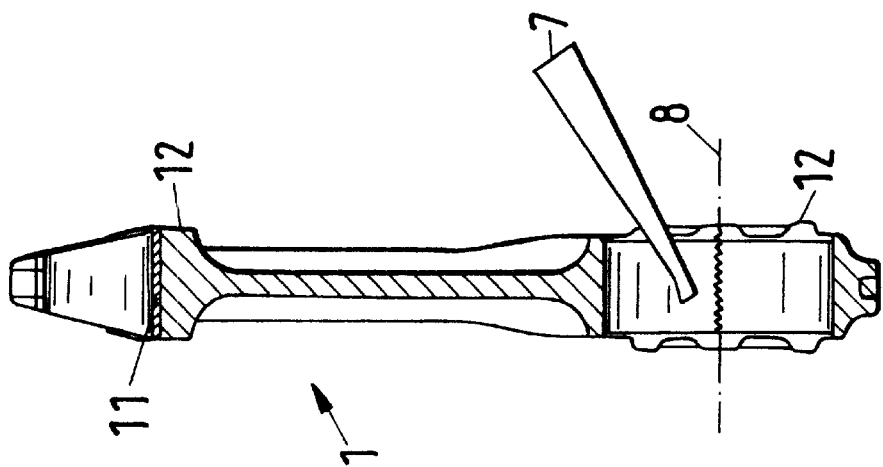
FIG. 2 is a vertical sectional view of the connecting rod of FIG. 1.
Figure 1:
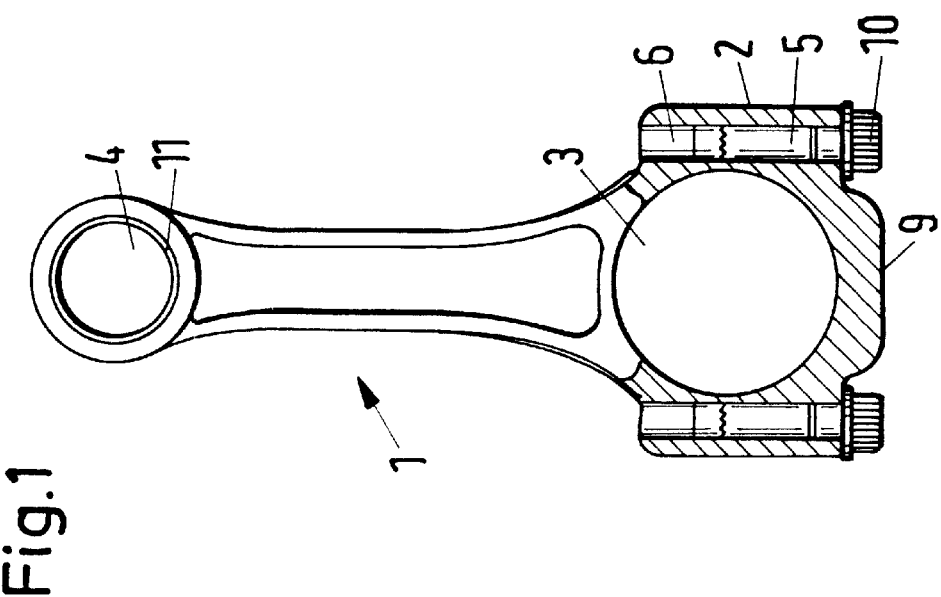
FIG. 1 is a front view showing a typical embodiment of a connecting rod according to the invention

In the manufacture of a typical connecting rod such as shown in FIGS. 1 and 2, the connecting rod eyes are provided with bearing shells, e.g. made of C 70 steel, and are placed on a production line. This is accompanied by preliminary grinding of the side surfaces 2 of the connecting rod. Subsequently, the large and the small connecting rod eyes 3 and 4 are pretreated, i.e. shaped to size. Additionally, the screwhole processing in the side surfaces 2 for a connecting rod bearing cover 9 takes place, i.e. bores 5 and threads 6 are made.

To prepare for cracking, a solid state laser 7 is introduced into the large connecting rod eye 3 at an angle of 45° as shown in FIG. 2. By operation of the laser 7, a notch 8 with a width of about 0.5 mm and a depth of about 0.3 mm to 0.5 mm is burnt into the surface of the large connecting rod eye 3 at the center of each side. Alternatively, the notch can also be made by a broaching tool.

When the notches 8 have been made, the large connecting-rod eye 3 is plasma-coated in the manner described below. When the plasma layer has been applied, the large connecting rod eye 3, together with the plasma layer, is cracked by a breaking device with a breaking force of about 100 kN. The breaking point is cleaned, for example, blasted with compressed air, and the broken off connecting rod bearing cover 9 is mounted by screws 10 at a selected torque. The small connecting rod eye is also prepared by pressing in a bush 11. The flat side surfaces 12 are then finished by grinding.

The large connecting rod eye 3 and, if appropriate, also the small connecting rod eye 4, are then made to size by fine drilling or fine spindling to produce a bearing layer with a thickness 16. Subsequently, the connecting rod is subjected to a complete cleaning, is measured and is classified.

The production process for a cut connecting rod is essentially the same as the process described above, but the large connecting rod eye is separated by being cut open after the broaching of the side surfaces, the top surfaces and the screw supports. After it has been cut open, the separation surfaces on the connecting rod and the connecting rod bearing cover are broached individually. This is followed by a washing operation, after which the small connecting rod eye is pretreated and finished. The cover screws are then inserted into the side surfaces by introducing bores and threads. The separation surfaces on the connecting rod and the connecting rod bearing cover are finished by grinding and washed again, and the connecting rod bearing cover is mounted on the connecting rod. The cut surface is again notched using a solid state laser and subsequently the large connecting rod eye is provided with the bearing layer which is subsequently broken again.

Individual production steps such as, for example, pressing the bearing shell 11 into the small connecting rod eye 4 can be carried out at different points in the overall process, for example, even before the plasma coating.

Figure 3:
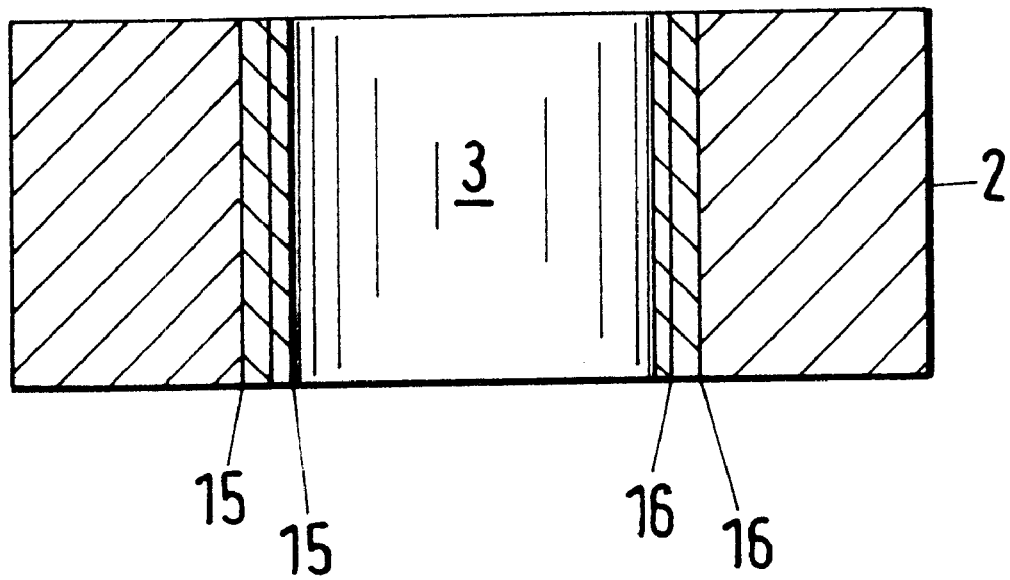
FIG. 3 is an enlarged cross-sectional view of the connecting rod of FIGS. 1 and 2 illustrating a layer coating structure in the large connecting rod eye.

For the plasma coating, the connecting rods are washed, and the large connecting rod eye is degreased using hot steam and is then dried so as to be virtually free from residual moisture. Connecting rods pretreated in this manner are stacked one above another 4 to 8 high, so that the large connecting rod eyes lie concentrically over a corresponding opening in a special pallet. In this case, the large connecting rod eyes are advantageously aligned and fixed using the pretreated small connecting rod eyes and the connecting rod side surfaces. The loaded pallets are passed over a zone of readiness into a sandblasting unit in which the large connecting rod eyes are sandblasted to achieve an average peak-to-valley height $R_a$ of about 8 μm to 12 μm. Subsequently, the connecting rods are moved into a cleaning station, and the sandblasted surface is blasted with compressed air. Finally, the pretreated connecting rods move into the plasma station in which the large connecting rod eyes are coated with an aluminum bronze to a layer thickness 15 (FIG. 3) of about 0.5 mm using a rotating plasma torch which may produce a rotating spray or a spray which is directed by a rotary spray diffuser. The coated connecting rods then enter a cooling zone from which the cooled connecting rods are removed from the special pallet and passed on for further processing in the manner described above.

The connecting rods produced according to the invention have the advantage that they do not contain a bearing shell in the large connecting rod eye, thus dispensing with the actual assembly of bearing shells and the introduction of holding grooves and the deburring of the bearing shells. As a result, the application of the plasma layer is competitive in terms of cost. Additionally, in the case of the plasma-coated connecting rods, the reliability of assembly is increased, since no bearing shells can be left out during assembly.

The connecting rods according to the invention have a greater web thickness around the large connecting rod eye in the region of the attachment of the bearing cover since the plasma layer is only about 0.3 mm thick after reworking but a bearing shell is 2.5 mm thick. As a result, higher loading of the connecting rod for higher-loaded engines and/or a saving in weight is possible. Additionally, there is no gap between two bearing-shell halves at which an oil film begins to tear away under higher loading. The connecting rods produced according to the invention thus have improved lubricating properties.

Although the invention has been described herein with reference to specific embodiments, many modifications and variations therein will readily occur to those skilled in the art. Accordingly, all such variations and modifications are included within the intended scope of the invention.

We claim:

1. A method of producing a connecting rod with a connecting rod eye having a bearing layer comprising:
   opening a connecting rod eye by separating the connecting rod eye into parts;
   fitting the resulting parts of the connecting rod eye together;
   then notching the surface of the connecting rod eye along the joint lines between the parts;
   then applying a bearing layer directly to a connecting rod eye by thermal spraying of a bearing material; and
   breaking the bearing layer along the notched regions of the surface of the eye.

2. A method of producing a connecting rod with a connecting rod eye having a bearing layer comprising applying a bearing layer directly to a connecting rod eye by thermal spraying of a bearing material and reworking flat side surfaces of the connecting rod after the bearing material has been applied.

3. A method of producing a connecting rod with a connecting rod eye having a bearing layer comprising applying a bearing layer directly to a connecting rod eye by thermal spraying of a bearing material and roughening the connecting rod eye before the bearing material is applied.

4. A method of producing a connecting rod with a connecting rod eye having a bearing layer comprising applying a bearing layer directly to a connecting rod eye by thermal spraying of a bearing material while applying bearing material to the connecting rod eyes of a plurality of connecting rods which are positioned with the eyes concentrically one above another.

5. A method of producing a connecting rod with a connecting rod eve having a bearing layer comprising applying a bearing layer directly to a connecting rod eye by thermal spraying of a bearing material and including the step of covering a connecting rod eye to be coated with bearing material with a template adjacent to a flat side surface of the connecting rod, the template having an opening of approximately the same size as the connecting rod eye which is positioned concentrically with the connecting rod eye.

6. A method according of producing a connecting rod with a connecting rod eye having a bearing layer comprising applying a bearing layer directly to a connecting rod eye by thermal spraying of a bearing material and including the step of passing a gas stream through the connecting rod eye at a flow velocity in the range from about 3 m/s to about 15 m/s during thermal spraying.

7. A method of producing a connecting rod with a connecting rod eye having a bearing layer comprising applying a bearing layer directly to a connecting rod eye by thermal spraying of a bearing material including applying from 4 to 30 layers of bearing material.

8. A method according to claim 1, 2, 3, 4, 5, 6, or 7 including applying the bearing material by plasma spraying.

9. A method according to claim 1, 2, 3, 4, 5, 6, or 7 including applying metal combined with at least one of a soft material and a solid lubricant as the bearing material.

10. A method according to claim 1, 2, 3, 4, 5, 6, or 7 including the step of mechanically reworking the applied bearing material.

11. A method according to claim 10, including honing or finely spindling the bearing material.

12. A method according to claim 1 including opening the connecting rod eye by cutting it open.

13. A method according to claim 10 including mechanically reworking the bearing material after opening of the connecting rod eye.

14. A method according to claim 1 including the step of boring an oil duct into the connecting rod eye after the bearing material has been applied.

15. A method according to claim 2 including reworking the flat side surfaces by grinding.

16. A method according to claim 3 including roughening the connecting rod eye by sand blasting.

17. A method according to claim 3 including roughening the connecting rod eye to an average peak-to-valley height $R_a$ in a range from about 4 µm to about 30 µm.

18. A method according to claim 17 including roughening the connecting rod eye to an average peak-to-peak-valley height $R_a$ in a range from about 8 µm to about 12 µm.

19. A method according to claim 4 wherein all of the plurality of connecting rods are assembled in one row of cylinders of an internal combustion engine.

20. A method according to claim 1 including measuring at least one characteristic of the bearing layer in a nondestructive manner after it has been coated with the bearing material.

21. A method according to claim 1, 2, 3, 4, 5, 6, or 7 including applying the bearing material by a rotating spray of bearing material.

22. A method according to claim 1, 2, 3, 4, 5, 6, or 7 including spraying on the bearing material in powder form.

23. A method according to claim 6 including passing the gas stream through the connecting rod eye at a flow velocity in the range from about 5 m/s to about 10 m/s.

24. A method according to claim 1, 2, 3, 4, 5, 6, or 7 including advancing the thermal spraying through the connecting rod eye at a rate in the range from about 0.5 mm/s to about 20 mm/s.

25. A method according to claim 1, 2, 3, 4, 5, or 6 including applying the bearing material in a plurality of layers to form the bearing layer.

26. A method according to claim 1 including opening the connecting rod eye by notching and breaking.

27. A method according to claim 25 including applying individual layers of the plurality in different application directions.

28. A method according to claim 27 including applying individual layers of the plurality in mutually opposite directions.

29. A method according to claim 1, 2, 3, 4, 5, 6, or 7 including providing the bearing layer with a thickness in the range from about 150 µm to about 800 µm.

* * * * *